May 18, 1948.  G. W. JARDINE  2,441,766
SHOCK ABSORBER FOR PNEUMATIC APPARATUS
Filed May 3, 1946   2 Sheets-Sheet 1
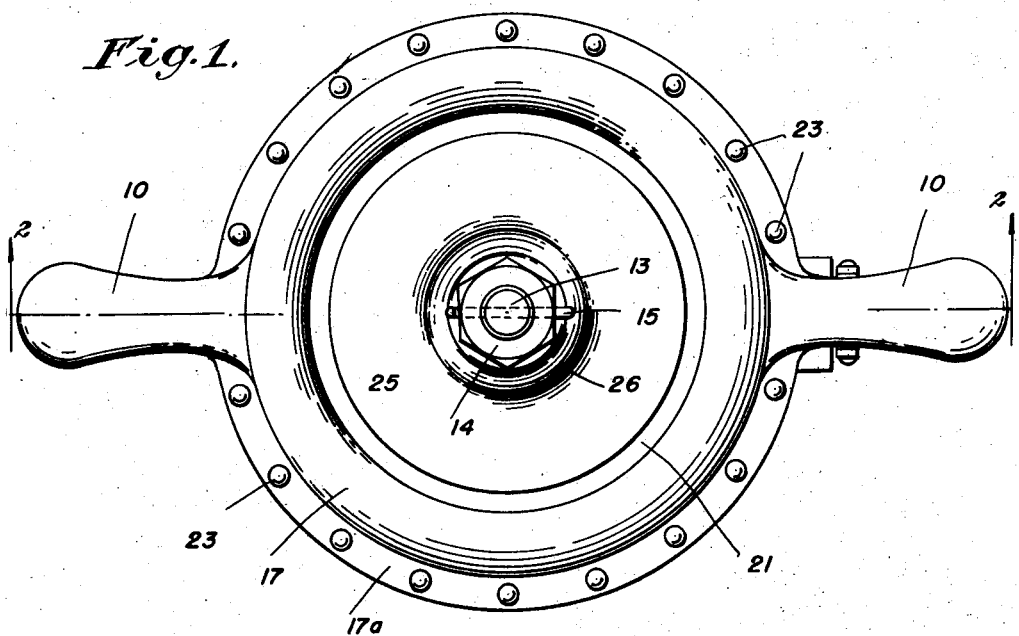
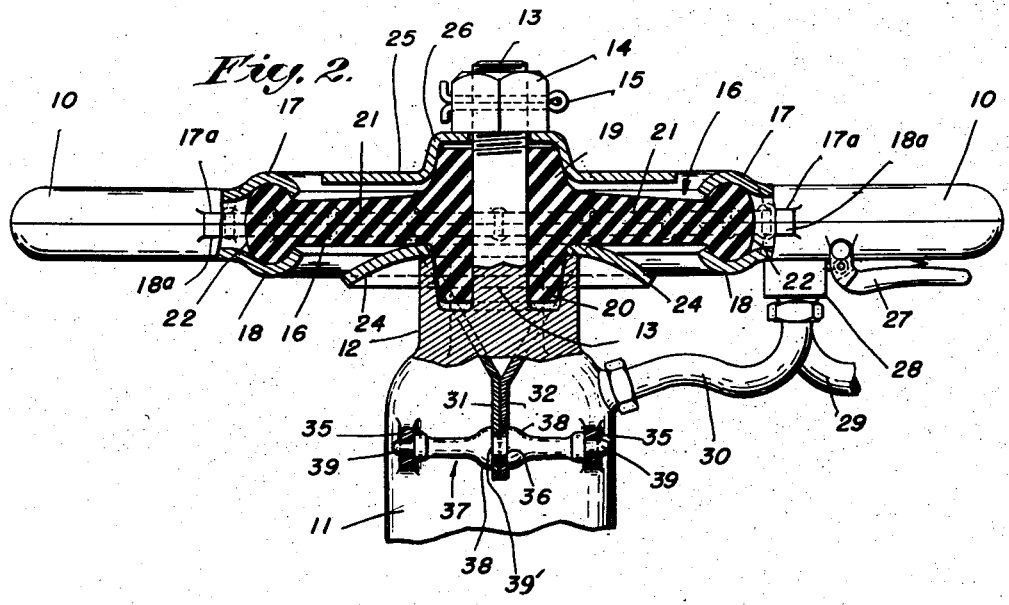
Inventor
George W. Jardine.
By James C. Hamilton
Atty

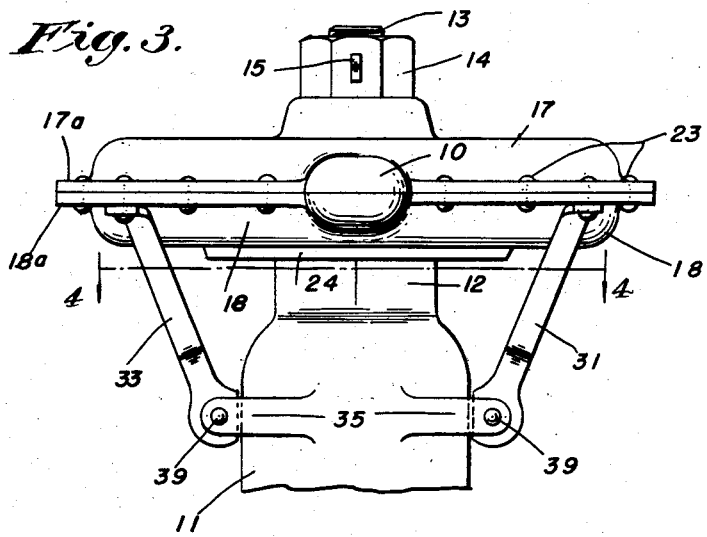
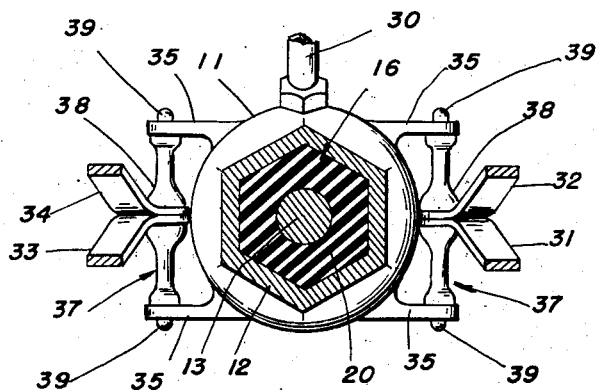

Patented May 18, 1948

2,441,766

UNITED STATES PATENT OFFICE 2,441,766

SHOCK ABSORBER FOR PNEUMATIC APPARATUS

George W. Jardine, Waltham, Mass.

Application May 3, 1946, Serial No. 667,138

4 Claims. (Cl. 121—36)

My present invention relates to shock absorbers and more particularly to shock absorbers for use with pneumatic apparatus such as drills, riveting hammers and the like.

It is a well known fact that equipment of this kind transmit an extremely heavy vibration and shock to the operator's body resulting in great fatigue when continued over a period of time therefore:

The principal object of my invention is to produce an improved shock absorber for apparatus of this kind;

Another object is to produce an improved shock absorber for this kind of apparatus which permits free movement of the tool up and down at any angle and at the same time reduce the shock delivered to the arms of the operator to a minimum, and Other objects and novel features comprising the construction and operation of my invention will be more apparent as the description of the same progresses.

In the drawing illustrated the preferred embodiment of my invention:

Fig. 1 is a plan view of the shock absorbing equipment;

Fig. 2 is a fragmentary partial cross-section and side elevation taken on the line 2—2 of Fig. 1, the handle portions and other lower portions being shown in elevation and other portions in the foreground being shown in cross-section;

Fig. 3 is a fragmentary side elevation with the apparatus turned ninety degrees to the right from the position shown in Figs. 1 and 2, and Fig. 4 is a plan cross-section taken on the line 4—4 of Fig. 3, the air hose line being broken off for convenience.

Referring more in detail to the drawings:

Fig. 1 clearly shows operating handles 10 which are grasped by the operator in the usual manner and from which the apparatus is controlled. 11 indicates the head of a pneumatic drill or hammer, as the case may be, having a hexagonally recessed upper end 12 from the central portion of which extends upwardly a stud 13 the upper end of which is threaded to receive a nut 14 and cotter pin 15. At 16, I have shown a substantially symmetrical rubber diaphragm which is tightly clamped in a split casing having an upper half 17 and a lower half 18. From an inspection of Fig. 2 it will be noted that the diaphragm 16 comprises a hub portion the upper side 19 of which is circular in shape and a lower hub portion 20 which is hexagonal in shape through which passes the stud 13. Radiating from the hub portions 19 and 20 is a tapering central web portion 21 terminating in a curved beading 22 which is securely clamped between the curved rim of the split casing halves 17 and 18. The two halves of the casing are provided with exterior circular flanges 17a and 18a which are securely clamped together by means of the rivets 23. Bolts may be used in place of rivets if desired.

Over the top of the hexagonal head of the member 12 and fitting closely to the hexagonal hub portion 20 of the diaphragm 16 is a dished disc 24. By a closer inspection of the diaphragm 16 it will be noted that the lower surface of the web portion 21 is not tapered but normally lies in a horizontal plane over the dished member 24 so that when the diaphragm is depressed, as in use, the rubber diaphragm follows the curve of the member 24 without tending to wrinkle or distort the diaphragm. The upper surface of the web portion of the diaphragm is tapered increasing in thickness toward the hub area. This taper on the upper side is important to the proper functioning of the apparatus and the degree of taper may vary as the size and type of tool changes in different operations. On the top of the round hub portion 19 of the diaphragm hub is fitted another disc 25 having a recessed portion 26 adapted to snugly fit over the rubber hub portion 19 of the diaphragm. The flanged area of the disc 25 provides a back stop against which the tapered side of the diaphragm bears when the operator lifts the apparatus.

On the lower side of one of the handles is pivoted an air control lever 27, of any conventional type, which operates an air valve located in a junction box 28 also attached to the handle 10. Air enters from a flexible tube 29 and, controlled by the lever 27, passes to the pneumatic apparatus through the flexible tube 30. Due to the hexagonal shape of the recessed portion 12 and the corresponding shape of the lower portion 20 of the diaphragm hub the shock absorber is prevented from turning on the pneumatic apparatus 11 thereby maintaining the flexible tubes 29 and 30 in their proper position.

When the apparatus is assembled on the apparatus 12 the nut 14 is screwed down tightly so that the hub member 20 is firmly imbedded in the hexagonal recess of the apparatus 12 and the disc 25 is firmly seated on the hub portion 19, additional clearance under the recessed portion of the disc 25 and the lower portion of the hub portion 20 being provided for take-up.

To further stabilize the apparatus I have provided bracket members on opposite sides of the device comprising strap members 31 and 32 preferably welded together at the lower abutting ends the upper ends of which are riveted or otherwise secured to the flanges 17a and 18a. Similar strap members 33 and 34 are fitted to the opposite side of the apparatus. On opposite sides of the pneumatic apparatus 11 I have provided lugs 35 being provided with holes axially aligned with a large hole 36 located through the welded ends of the brackets. Connecting the brackets with the lugs 35 are a pair of rubber connecting pins 37, one on each side of the apparatus. These rubber connectors are made of a semi-flexible rubber of suitable proportions so that one end of the pin can be forced through the hole in the bracket by compressing the rubber hub 38 so that the groove 39' is seated, as shown in Fig. 2, in the opening. In a similar manner, the ends 39 are napped into the openings in the lugs 35. The rubber pins yieldingly hold the brackets in the normal position shown in the drawings and provide a yielding and shock absorbing support to the upper structure.

It will thus be apparent that I have designed a very flexible shock absorber for pneumatic drills and the like which is efficient and simple in operation, and while the preferred embodiment is shown somewhat in detail yet it is to be understood that I may vary the shape and proportions within wide limits without departing from the spirit of the appended claims.

Having thus described my invention what I claim as new is:

1. An improved shock absorber for pneumatic tools, comprising, a flexible diaphragm engaged with said tool, the said diaphragm having a hub, web and rim, the lower portion of said hub having hexagonial sides engaged in a hexagonial recess located in said tool for the purpose of preventing rotation between said tool and said hub, a casing having an annular split clamping ring engaging over said rim, a back stop member located above said diaphragm and having a recess engaging over the upper portion of said hub and a flange parallelly disposed to the upper side of said diaphragm, a lower stop member located below said diaphragm and engaging over the top of said tool, brackets attached to said casing their lower ends being attached to a flexible member mounted on said tool, and means for clamping said back-stop member, diaphragm and lower stop member to said tool.

2. An improved shock absorber for pneumatic tools comprising, a flexible diaphragm engaged with said tool, the said diaphragm comprising a hub, web and rim, the upper surface of said web being inclined upwardly from said rim to said hub, the lower portion of said hub having hexagonial sides engaged in a hexagonial recess located in said tool for the purpose of preventing rotation between said tool and said hub, a casing comprising an annular ring clamped over said diaphragm rim, a back-stop member located above said diaphragm and having a receiving area adapted to receive the upper portion of said hub, a flange connected to said back-stop member horizontally disposed over and above the upper surface of said diaphragm, a convexed lower stop member engaged against the lower side of said diaphragm adjacent the lower portion of said hub and contacting the top of said tool, brackets attached to said casing their lowermost portions being engaged with a transverse flexible pin anchored in lugs attached to said tool.

3. An improved shock absorber for pneumatic tools comprising, a flexible diaphragm engaged with said tool, the said diaphragm comprising a hub, web and rim, the upper surface of said web being inclined upwardly from said rim to said hub, the lower side of said web being horizontally disposed to the upper surface, the lower portion of said hub having hexagonial sides engaged in a hexagonial recess located in said tool for the purpose of preventing rotation between said tool and said hub, a casing comprising an annular ring clamped over the rim of said diaphragm, a back-stop member located above said diaphragm and having a receiving area adapted to receive the upper portion of said hub, a flange connected to said back-stop member horizontally disposed over and above the upper surface of said diaphragm, a convexed lower stop member engaged against the lower side of said diaphragm adjacent the lower portion of said hub and contacting the top of said tool, brackets attached to said casing their lowermost portions being engaged with a transverse flexible pin anchored in lugs attached to said tool.

4. An improved shock absorber for pneumatic tools comprising, a flexible diaphragm engaged with said tool, the said diaphragm comprising a hub, web and rim, the said hub being mounted on a stud anchored in said tool, the upper surface of said web being inclined upwardly from said rim to said hub, the lower side of said web being horizontally disposed to the upper surface, the lower portion of said hub having hexagonial sides engaged in a hexagonial recess located in said tool for the purpose of preventing rotation between said tool and said hub, a casing comprising an annular ring clamped over the rim of said diaphragm, a back-stop member located above said diaphragm and having a receiving area to receive the upper portion of said hub, a flange connected to said back-stop member horizontally disposed over and above the upper surface of said diaphragm, a convexed lower stop member engaged against the lower side of said diaphragm adjacent the lower portion of said hub and contacting the top of said tool, brackets attached to said casing their lowermost portions being engaged with a transverse flexible pin anchored to said tool, operator handles attached to said casing for holding said apparatus in use, and means adjacent one of said handles controlling compressed air admitted to said tool.

GEORGE W. JARDINE.

REFERENCES CITED

The following references are of record in the file of this patent:

UNITED STATES PATENTS

| Number | Name | Date |
| --- | --- | --- |
| 972,548 | Levedahl | Oct. 11, 1910 |
| 1,860,883 | Bilde | May 31, 1932 |
| 2,035,643 | Douglass | Mar. 31, 1936 |
| 2,061,806 | Noble | Nov. 24, 1936 |
| 2,137,480 | Dye | Nov. 22, 1938 |
| 2,270,336 | Paulus | Jan. 20, 1942 |
| 2,305,814 | Schieferstum | Dec. 22, 1942 |
| 2,340,629 | Trier | Feb. 1, 1944 |
| 2,387,065 | Harding | Oct. 16, 1945 |
| 2,415,280 | Fink | Feb. 4, 1947 |